United States Patent
Esteghlal

(10) Patent No.: US 10,615,690 B2
(45) Date of Patent: Apr. 7, 2020

(54) FEED-FORWARD CONTROLLED DC-DC VOLTAGE CONVERTER AND METHOD FOR REGULATING A FEED-FORWARD CONTROLLED DC-DC VOLTAGE CONVERTER

(71) Applicant: Robert Bosch GmbH, Stuttgart (DE)

(72) Inventor: Gholamabas Esteghlal, Stuttgart-Weilimdorf (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 16/326,122

(22) PCT Filed: Aug. 10, 2017

(86) PCT No.: PCT/EP2017/070268
§ 371 (c)(1),
(2) Date: Feb. 15, 2019

(87) PCT Pub. No.: WO2018/033456
PCT Pub. Date: Feb. 22, 2018

(65) Prior Publication Data
US 2019/0181752 A1    Jun. 13, 2019

(30) Foreign Application Priority Data
Aug. 15, 2016  (DE) .................. 10 2016 215 147

(51) Int. Cl.
*H02M 3/156*  (2006.01)
*H02M 1/44*   (2007.01)
*H02M 1/00*   (2006.01)

(52) U.S. Cl.
CPC ............. *H02M 3/156* (2013.01); *H02M 1/44* (2013.01); *H02M 2001/0016* (2013.01); *H02M 2001/0025* (2013.01)

(58) Field of Classification Search
CPC ................... H02M 3/156; H02M 1/44; H02M 2001/0016; H02M 2001/0025
See application file for complete search history.

(56) References Cited

U.S. PATENT DOCUMENTS

| | | | |
|---|---|---|---|
| 2010/0231183 A1 | 9/2010 | Jan et al. | |
| 2014/0125306 A1* | 5/2014 | Babazadeh | G05F 5/00 323/285 |

(Continued)

FOREIGN PATENT DOCUMENTS

DE       102011083010       3/2013

OTHER PUBLICATIONS

International Search Report for Application No. PCT/EP2017/070268 dated Sep. 29, 2017 (English Translation, 2 pages).

*Primary Examiner* — Jue Zhang
*Assistant Examiner* — Lakaisha Jackson
(74) *Attorney, Agent, or Firm* — Michael Best & Friedrich LLP

(57) ABSTRACT

The present invention relates to the regulation of the output voltage of a DC-DC voltage converter. The controlled variable provided to the regulator of the DC-DC voltage converter is composed in this case of a controlled variable of a voltage regulator and a further controlled variable of a feed-forward control. The controlled variable of the voltage regulator is produced here directly from the comparison of the output voltage with a setpoint voltage. The controlled variable of the feed-forward control takes into consideration, inter alia, the input current of the DC-DC voltage converter, wherein the value of the input current can be corrected in such a way that the voltage regulator can be operated close to the zero point during stationary operation. A more rapid and more precise regulation of the output voltage is produced in this way.

9 Claims, 3 Drawing Sheets

(56) References Cited

U.S. PATENT DOCUMENTS

| | | |
|---|---|---|
| 2014/0217817 A1 | 8/2014 | Raichle et al. |
| 2014/0292293 A1 | 10/2014 | Feckl et al. |
| 2015/0372605 A1* | 12/2015 | Karlsson ............. H02M 3/3376 |
| | | 363/21.06 |
| 2017/0264185 A1* | 9/2017 | Karlsson ................ H02M 3/157 |
| 2018/0166979 A1* | 6/2018 | Shimizu .................. H02M 1/14 |
| 2019/0097535 A1* | 3/2019 | Otsuka .................. H02M 3/158 |

* cited by examiner

FEED-FORWARD CONTROLLED DC-DC VOLTAGE CONVERTER AND METHOD FOR REGULATING A FEED-FORWARD CONTROLLED DC-DC VOLTAGE CONVERTER

BACKGROUND OF THE INVENTION

The present invention relates to a DC-DC voltage converter and to a method for regulating a DC-DC voltage converter. In particular, the present invention relates to a DC-DC voltage converter for converting a DC input voltage to a predetermined DC output voltage.

In electric or hybrid vehicles, the power supply to a low-voltage on-board power supply system can be ensured by a high-voltage power supply system of the vehicle. The high-voltage power supply system of the vehicle is used here, in particular, for supplying power to the electric drive. In order to feed electrical energy into the low-voltage on-board power supply system of an electric or hybrid vehicle by way of the high-voltage power supply system, a DC-DC voltage transducer, for example, can be used. Such DC-DC voltage transducers can draw electrical energy from the high-voltage power supply system and convert the voltage of the high-voltage power supply system to a corresponding on-board power supply system voltage.

The document DE 10 2011 083 010 A1 discloses a control apparatus for a DC-DC voltage transducer and a method for operating a DC-DC voltage transducer for the supply of voltages to an on-board power supply system of a hybrid vehicle from a high-voltage power supply system. To this end, a voltage regulation device is provided, which regulates the output voltage of the DC-DC voltage transducer as a controlled variable. Furthermore, a current regulation device is provided, which regulates the output current of the DC-DC voltage transducer as a controlled variable.

SUMMARY OF THE INVENTION

The present invention discloses a DC-DC voltage converter for converting a DC input voltage to a predetermined DC output voltage, and a method for regulating a DC-DC voltage converter.

Accordingly, the following is provided:

a DC-DC voltage converter for converting a DC input voltage to a predetermined DC output voltage, having a comparison device, a correction device, a regulation device, a computation device and a DC-DC voltage transducer. The comparison device is designed to provide a controlled variable based on a comparison of the value of the DC output voltage of the DC-DC voltage converter with a prescribed setpoint voltage value for the DC output voltage. The correction device is designed to adjust a value of an input current of the DC-DC voltage converter based on a previously determined correction function, and to output the value of the adjusted input current. The regulation device is designed to calculate a further controlled variable using the adjusted input current and the prescribed setpoint voltage value for the DC output voltage. The computation device is designed to calculate a regulator value from the controlled variable of the comparison device and the further controlled variable of the regulation device. The DC-DC voltage transducer is designed to convert the DC input voltage to the DC output voltage using the regulator value calculated by the computation device.

Furthermore, the following is provided:

a method for regulating a DC-DC voltage converter, having the steps of identifying a controlled variable based on a comparison of the value of a DC output voltage of the DC-DC voltage converter with a prescribed setpoint voltage value for the DC output voltage; adjusting a value of an input current of the DC-DC voltage converter based on a previously determined correction function; calculating a further controlled variable using the value of the adjusted input current and the prescribed setpoint voltage value for the DC output voltage; combining the identified controlled variable and the calculated further controlled variable to form a regulator value; and controlling the output voltage of a DC-DC voltage transducer based on the regulator value.

The present invention is based on the knowledge that regulation, such as, for example, the voltage regulation of a DC-DC voltage transducer, can be carried out particularly quickly and efficiently when the corresponding regulator has to correct only a low regulator deviation.

It is therefore a concept of the present invention to take this knowledge into consideration and to provide feed-forward control for the voltage regulation of the output voltage of a DC-DC voltage transducer, said feed-forward control being able to be adjusted to the input current of the DC-DC voltage transducer in an adaptive manner. Owing to the adaptive adjustment of the controlled variable of the feed-forward control to the input current, it is therefore only necessary for the actual voltage regulator to correct the remaining low voltage fluctuations at the output of the DC-DC voltage transducer.

The adaptive adjustment of the feed-forward control leads in this case to a relatively low regulator deviation in the case of a change of operating point. As a result, the dynamic behavior of the voltage regulation of the DC-DC voltage converter can be improved.

In accordance with one embodiment, the correction device is designed to calculate the correction function for the adjustment of the value of the input current using the controlled variable identified by the comparison device and the value of the input current. If, in particular in the case of stationary operation, it is detected based on the controlled variable that the controlled variable of the comparison device in stationary operation has to intervene in the regulation in order to achieve the desired output voltage at the output of the DC-DC voltage transducer, this is an indication that the feed-forward control and, in particular, the consideration of the present input current of the DC-DC voltage converter is not set in an optimum manner. By adjusting the correction function for the adjustment of the value of the input current, a feed-forward control can be adjusted to the extent that where possible no or only a very low degree of intervention by the controlled variable of the comparison device is required in stationary operation.

In accordance with one embodiment, the correction device is designed to adjust the correction function when a prescribed enable condition is satisfied. Such an enable condition may comprise, for example, parameters such as, for example, the operating mode of the DC-DC voltage transducer, a value range for the input current into the DC-DC voltage transducer, an evaluation of the DC output voltage of the DC-DC voltage transducer and/or a comparison of the controlled variable of the comparison device with a prescribed threshold value. The parameters mentioned above may be linked with one another and possibly with further parameters in order to initiate an enable condition for the adjustment of the correction function therefrom.

In accordance with one embodiment, the DC-DC voltage transducer comprises a transformer. In this case, the regulation device can be designed to calculate the correction value using the transformation ratio of the transformer. By taking the transformation ratio of the transformer in the DC-DC voltage transducer into consideration, it is possible to deduce the voltage ratios on the output side from the voltage ratios on the input side of the DC-DC voltage converter.

In accordance with one embodiment of the method for regulating a DC-DC voltage converter, the correction function is calculated using the identified controlled variable and the value of the input current.

In accordance with a further embodiment, the correction function is calculated when a prescribed enable condition is satisfied. In this case, the enable condition may take into consideration parameters such as the operating mode of the DC-DC voltage transducer, a value range of the input current in the DC-DC voltage transducer, an evaluation of the output voltage of the DC-DC voltage transducer and/or a comparison of the controlled variable with a predetermined threshold value.

In accordance with a further embodiment, the regulator value is calculated using a value of the DC input voltage into the DC-DC voltage transducer. By taking into account the DC input voltage into the DC-DC voltage transducer, particularly parasitic effects, such as, for example, voltage drops across lines or components, etc. can also be concomitantly taken into consideration.

The above refinements and developments can, where expedient, be combined with one another in any desired manner. Further refinements, developments and implementations of the invention also comprise combinations, which have not been explicitly mentioned, of features of the invention described above or below in respect of the exemplary embodiments. In particular, a person skilled in the art will in this case also add individual aspects as improvements or additions to the respective basic forms of the invention.

BRIEF DESCRIPTION OF THE DRAWINGS

The present invention is explained in more detail in the following text with reference to the exemplary embodiments specified in the schematic figures of the drawings, in which.

DETAILED DESCRIPTION

Unless stated otherwise, elements and devices that are the same or functionally the same are provided with the same reference symbols throughout the figures.

Figure 1:
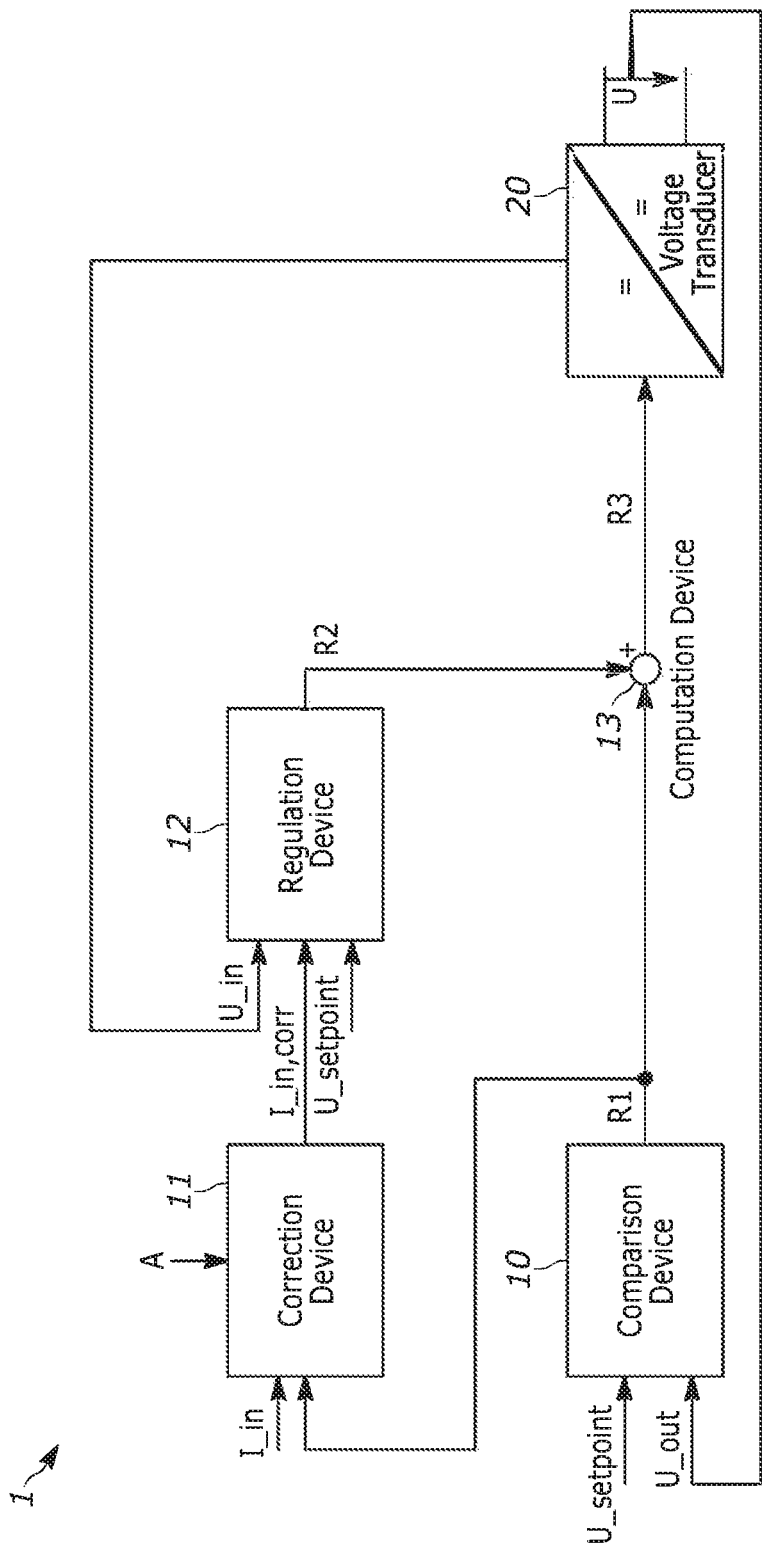
FIG. 1: shows a schematic illustration of a DC-DC voltage converter in accordance with one exemplary embodiment.

FIG. 1 shows a schematic illustration of a block circuit diagram of a DC-DC voltage converter 1 in accordance with one embodiment. The DC input voltage is converted to the DC output voltage here in the DC-DC voltage transducer 20. In order to achieve a constant DC output voltage at a prescribed voltage level for the output voltage of the DC-DC voltage converter 1, voltage regulation takes place here. In this case, the voltage regulation comprises feed-forward control based on the value of the input current I_in by means of the correction device 11 and the regulation device 12, and voltage regulation by means of the comparison device 10. The controlled variables of the comparison device 10 and the feed-forward control are combined with one another in the computation device 13 and fed to the DC-DC voltage transducer 20 as regulator value R3.

The DC-DC voltage transducer 20 receives the regulator value R3, which results from combination of the controlled variable R1 of the comparison device 10 with the further second controlled variable R2 of the feed-forward control. Based on the received regulator value R3, the operating point is adjusted in the DC-DC voltage transducer 20. For example, a duty cycle for actuating switching elements in the DC-DC voltage transducer 20 can be adjusted depending on the received regulator value R3. Furthermore, any desired suitable further measures for adjusting an operating point are possible to adjust the output voltage U_out of the DC-DC voltage transducer 20 depending on the received regulator value R3.

The DC-DC voltage transducer 20 may in this case be any desired DC-DC voltage transducer whose output voltage can be adjusted depending on a regulator value R3. In particular, the DC-DC voltage transducer 20 may be, for example, a buck converter, which converts a DC input voltage U_in to a lower DC output voltage U_out. However, boost converters or combined buck-boost converters, are also possible. In particular, the DC-DC voltage transducer 20 may comprise, for example, a combination of an inverter, a transformer and a downstream rectifier. In this case, the actuation of the switching elements of the inverter of such a DC-DC voltage transducer and/or an actuation of switching elements of an active rectifier in a DC-DC voltage transducer can be adjusted depending on a received regulator value. Any desired further circuit configurations for a DC-DC voltage transducer are also likewise possible.

In this case, the DC-DC voltage transducer 20 is intended to output the most constant possible DC output voltage U_out if possible even in the case of a fluctuating input voltage U_in. In this case, the prescribed setpoint voltage value U_setpoint for the DC output voltage U_out can be fixedly prescribed. As an alternative, however, it is also possible for the setpoint voltage value U_setpoint for the DC output voltage U_out to be adjustable.

For regulation of the output voltage U_out, the value of the DC output voltage U_out is fed to the comparison device 10 and the value of the DC output voltage U_out is compared in the comparison device 10 with the prescribed setpoint voltage value U_setpoint. Depending on the comparison between the value of the DC output voltage U_out and the setpoint voltage value U_setpoint, the comparison device 10 determines a first controlled variable R1 and provides this at the output of the comparison device 10.

The regulation device 12 furthermore generates a second controlled variable R2. For the generation of the second controlled variable R2, the regulation device 12 in this case compares the prescribed setpoint voltage value U_setpoint for the DC output voltage with a value that corresponds to the input current I_in. In this way, the regulation device 12 can generate a second controlled variable R2 that takes fluctuations in the input current I_in into consideration. Subsequently, the first controlled variable R1 of the comparison device 10 and the second controlled variable R2 of the regulation device 12 are combined with one another in the computation device 13. For example, analog or digital signals of the first and second controlled variable R1 and R2 can be added or superposed here. The computation device 13 therefore generates a regulator value R3 from the combination of the first controlled variable R1 and the second controlled variable R2, said regulator value being used to control the operation of the DC-DC voltage transducer 20 and, in particular, to adjust the DC output voltage U_out of the DC-DC voltage transducer 20.

In a manner determined by the system, errors may possibly occur here during the detection of the input current I_in. For example, a current sensor used to detect the value of the input current I_in may be incorrectly calibrated or supply inaccurate measurement values on account of temperature influences or aging. Further influences that lead to incorrect or inaccurate values of the input current I_in are also possible, of course. In this case, the regulation device 12 would supply, as second controlled variable R2, a controlled variable that would cause the DC-DC voltage transducer 20 to output a DC output voltage U_out whose value deviates from the prescribed setpoint voltage value U_setpoint. To compensate for this deviation, the comparison device 10 would have to continuously generate a first controlled variable R1 that counteracts said deviation. The combination of the first controlled variable R1 and the second controlled variable R2 in the computation device 13 also leads in this case to the DC-DC voltage transducer 20 supplying a DC output voltage U_out at the prescribed voltage level.

However, in order to prevent the comparison device 10 also having to intervene in the regulating process in stationary operation, in particular in the case of a constant DC input voltage U_in, the value of the input current I_in is adjusted in the correction device 11. To this end, the correction device 11 receives a value of the input current I_in of the DC-DC voltage converter 1. For example, this value of the input current I_in may have been detected by a current sensor or like. The value of the input current I_in is adjusted in the correction device 11 based on a previously determined correction function and said adjusted value I_in,corr is subsequently provided as an input parameter of the regulation device 12. In this case, any desired suitable functions are possible for the correction function for adjusting the value of the input current I_in. In the simplest case, a constant offset can be added to or subtracted from the value of the input current I_in, for example. In addition or as an alternative, multiplication by a suitable correction factor is also possible. Furthermore, the identification of more complex correction functions for the adjustment of the value of the input current I_in is also possible. One example for the identification of a correction function for adjusting the value of the input current I_in is explained in even more detail in the following text.

The correction device 11 therefore identifies the second controlled variable R2 from the adjusted value I_in,corr of the input current and the prescribed setpoint voltage value U_setpoint, said second controlled variable being used as a component in the calculation of the regulator value R3 for controlling the DC-DC voltage transducer 20. The aim here is to achieve, during stationary operation, that is to say in the case of a constant DC input voltage U_in and static operating conditions, a DC output voltage U_out that requires the least possible intervention of the comparison device 10 by means of the first controlled variable R1. If necessary, in addition to the corrected value I_in,corr of the input current, another value of the input voltage U_in applied to the DC-DC voltage transducer 20 can also be concomitantly used to this end in the determination of the second controlled variable R2 by way of the regulation device 12. By taking the input voltage U_in into consideration, fluctuating voltage drops across lines or components, for example, can in this case concomitantly be taken into consideration.

To adjust and/or determine the correction function in the correction device 11, the first controlled variable R1 that has been generated by the comparison device 10 can be used, for example. If a first controlled variable R1 originating from a differential intermediate value of the DC output voltage U_out and the setpoint voltage value U_setpoint is generated by the comparison device 10 during stationary operation, the second controlled variable R2 of the regulation device 12 is not set optimally. This can originate, inter alia, from an incorrect adjustment of the value I_in,corr of the input current in the correction device 11. If such a first controlled variable R1 is detected by the correction device 11 during stationary operation, the correction function can be adjusted accordingly in the correction device 11. In particular, the correction of the value of the input current I_in can be adjusted in such a way that the first controlled variable R1 of the comparison device 10 during stationary operation becomes zero. To this end, the correction device 10 may, for example, adjust an offset and/or a correction factor using the first controlled variable R1. After the adjustment of the correction function in the correction device 11 has finished, the output voltage of the DC-DC voltage transducer 20 is regulated as far as possible exclusively by means of the second controlled variable R2. During stationary operation, the first controlled variable R1 of the comparison device 10 should in this case be as close as possible to the zero point.

However, the correction function is not adjusted in the correction device 11 continuously but only under previously stipulated boundary conditions. To this end, for example, the correction function can be adjusted in the correction device 11 only when a prescribed enable condition is satisfied. For example, an activation signal A can be provided at the correction device 11. Only when this activation signal A is active (for example logic 1) is the first controlled variable R1 evaluated for adjusting the correction function.

Figure 2:
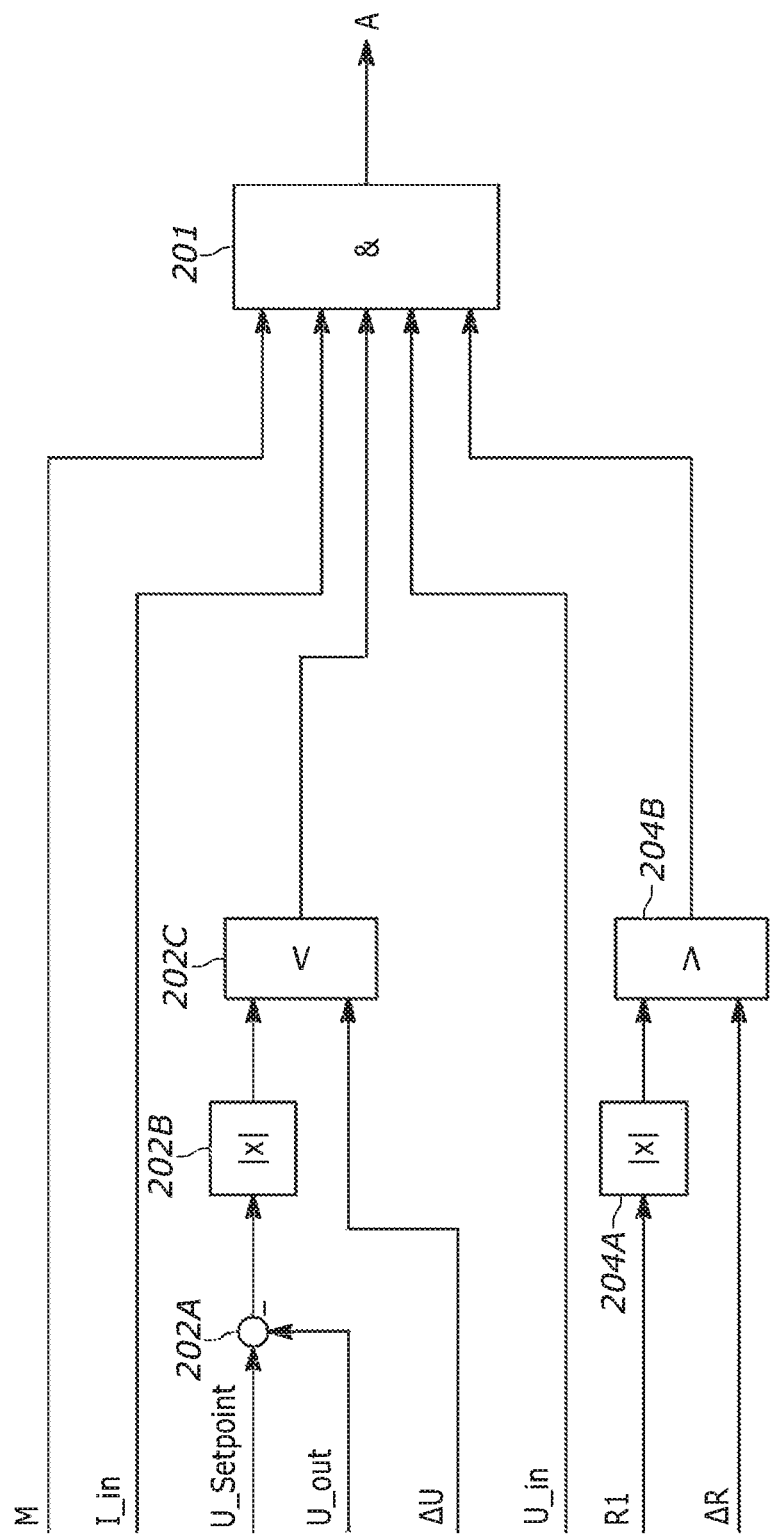
FIG. 2: shows a schematic illustration of a diagram for identifying an enable condition, such as is based on a DC-DC voltage converter in accordance with one exemplary embodiment.

FIG. 2 shows a schematic illustration for the generation of an enable condition for adjusting the correction function in accordance with one embodiment. The AND function 201 receives two or more inputs and outputs the enable condition A in response to at least one input satisfying a prescribed enable condition. For example, an operating mode M of the DC-DC voltage transducer 20 can be evaluated for the determination of the enable condition. In particular, the activation can be restricted only to one predetermined operating mode M, such as, for example, buck converter operation, boost converter operation, etc.

Furthermore, the direct current I_in flowing into the voltage converter 1 can also be evaluated. For example, the enabling for the adjustment of the correction function can be limited to a previously determined value range for the input current I_in. In this way, it can be ensured, for example, that the DC-DC voltage transducer 20 is not in discontinuous mode and therefore no linear boundary conditions would be provided.

Furthermore, for the determination of the enable condition A, it is possible to check, for example, whether the system is in a steady state. If, for example, the DC output voltage U_out deviates from the prescribed setpoint voltage value U_setpoint by more than a predetermined threshold value ΔU (determined, for example, by calculating a difference between the DC output voltage U_out and the predetermined setpoint voltage value U_setpoint, via differentiator 202A, determining the absolute value of the difference via an absolute value function 202B, and determining, via the lass than function 202C, whether the difference is less than the predetermined threshold value ΔU), the system is not yet corrected. In this case, enabling for adjustment of the correction function should not take place.

Furthermore, it is also possible to check whether the input voltage U_in, which is applied, for example, to the DC-DC voltage transducer 20, is stable.

Furthermore, it is also conceivable to carry out the adjustment of the correction function only when the intervention of the first controlled variable R1 of the comparison device 10 exceeds a prescribed threshold value ΔR. For example, as shown in FIG. 2, by determining the absolute value of the first controlled variable ΔR via an absolute value function 204A and determining, via a greater than function 204B, whether the first controlled variable R1 exceeds the prescribed threshold value ΔR.

It goes without saying that the calculation of the enable condition is not limited to the previously determined conditions. It is possible to combine all of the previously determined boundary conditions with one another or also to evaluate just some of the previously described boundary conditions for an enable condition A. Furthermore, further boundary conditions can also be concomitantly used as parameters for the determination of the enable condition A.

Figure 3:
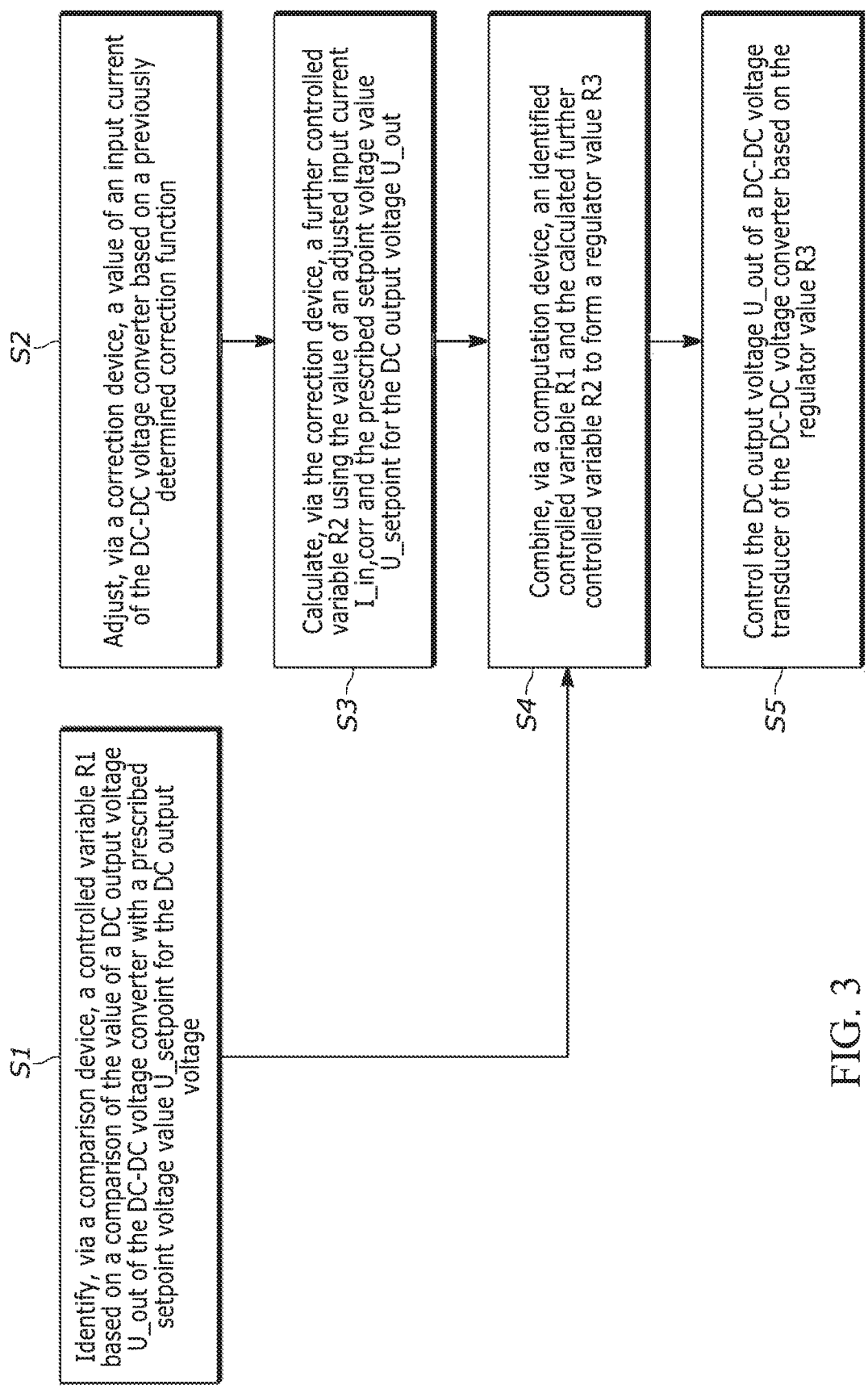
FIG. 3: shows a flowchart for a method for regulating a DC-DC voltage converter, as is based on an exemplary embodiment.

FIG. 3 shows a schematic illustration of a flowchart for a method for regulating a DC-DC voltage converter. In step S1, a controlled variable R1 is identified based on a comparison of the value of a DC output voltage U_out of the DC-DC voltage transducer 20 with a prescribed setpoint voltage value U_setpoint for the DC output voltage U_out. In step S2, the value of the input current I_in of the DC-DC voltage transducer 20 is adjusted based on a previously determined correction function. In step S3, a further controlled variable R2 is calculated using the value I_in,corr of the adjusted input current and the prescribed setpoint voltage value U_setpoint for the DC output voltage U_out. In step S4, the identified controlled variable R1 and the calculated further controlled variable R2 are combined to form a regulator value R3. Finally, in step S5, the DC-DC voltage transducer 20 is actuated based on the regulator value R3.

In summary, the present invention relates to the regulation of the output voltage of a DC-DC voltage converter. The controlled variable provided to the regulator of the DC-DC voltage converter is composed in this case of a controlled variable of a voltage regulator and a further controlled variable of a feed-forward control. The controlled variable of the voltage regulator is produced here directly from the comparison of the output voltage with a setpoint voltage. The controlled variable of the feed-forward control takes into consideration, inter alia, the input current of the DC-DC voltage converter, wherein the value of the input current can be corrected in such a way that the voltage regulator can be operated close to the zero point during stationary operation. A more rapid and more precise regulation of the output voltage is produced in this way.

The invention claimed is:

1. A DC-DC voltage converter (1) for converting a DC input voltage (U_in) to a predetermined DC output voltage (U_out), the DC-DC voltage converter comprising:
   a comparison device (10) configured to provide a controlled variable (R1) based on a comparison of a value of the DC output voltage (U_out) of the DC-DC voltage converter (1) with a prescribed setpoint voltage value (U_setpoint) for the DC output voltage (U_out), the controlled variable (R1) indicative of which value, between the DC output voltage (U out) value and the prescribed setpoint voltage value (U_setpoint), is greater;
   a correction device (11) configured to adjust a value of an input current (I_in) of the DC-DC voltage converter (1) based on a previously determined correction function, and to output a value (I_in,corr) of the adjusted input current;
   a regulation device (12) configured to calculate a further controlled variable (R2) using the value (I_in,corr) of the adjusted input current and the prescribed setpoint voltage value (U_setpoint) for the DC output voltage (U_out);
   a computation device (13) configured to calculate a regulator value (R3) from the controlled variable (R1) of the comparison device (10) and the further controlled variable (R2) of the regulation device (12); and
   a DC-DC voltage transducer (20) configured to convert the DC input voltage (U_in) to the DC output voltage (U_out) using the regulator value (R3) calculated by the computation device (13).

2. The DC-DC voltage converter (1) as claimed in claim 1, wherein the correction device (11) is designed to calculate the correction function using the identified controlled variable (R1) and the value of the input current (I_in).

3. The DC-DC voltage converter (1) as claimed in claim 2, wherein the correction device (11) is designed to adjust the correction function when a prescribed enable condition (A) is satisfied.

4. The DC-DC voltage converter (1) as claimed in claim 1, wherein the DC-DC voltage transducer (20) comprises a transformer, and wherein the regulation device (12) is designed to calculate the correction function using a transformation ratio of the transformer.

5. A method for regulating a DC-DC voltage converter (1), the method comprising:
   identifying (S1), via a comparision device (10), a controlled variable (R1) based on a comparison of a value of a DC output voltage (U_out) of the DC-DC voltage converter (1) with a prescribed setpoint voltage value (U_setpoint) for the DC output voltage;
   adjusting (S2), via a correction device (11), a value (I in,corr) of an input current of the DC-DC voltage converter (1) based on a previously determined correction function;
   calculating (S3), via the correction device (11), a further controlled variable (R2) using a value of the adjusted input current (I_in,corr) and the prescribed setpoint voltage value (U_setpoint) for the DC output voltage (U_out);
   combining (S4), via a computation device (13), the identified controlled variable (R1) and the calculated further controlled variable (R2) to form a regulator value (R3); and
   controlling (S5) the DC output voltage (U_out) of a DC-DC voltage transducer (20) of the DC-DC voltage converter (1) based on the regulator value (R3).

6. The method as claimed in claim 5, wherein the correction function is calculated using the identified controlled variable (R1) and the value of the input current (I_in).

7. The method as claimed in claim 5, wherein the correction function is calculated when a prescribed enable condition (A) is satisfied.

8. The method as claimed in claim 7, wherein the prescribed enable condition (A) includes at least one selected from the group consisting of a predetermined operating mode (M) of the DC-DC voltage transducer (20), an input current (I_in) into the DC-DC voltage transducer (20), an evaluation of an input voltage (U_in) of the DC-DC voltage transducer (20); an evaluation of the DC output voltage (U_out) of the DC-DC voltage transducer (20); a comparison of the controlled variable (R1) with a prescribed threshold value; or a combination of the foregoing.

9. The method as claimed in claim 5, wherein the calculation of the further controlled variable (R2) is also based on a value of the DC input voltage (U_in) into the DC-DC voltage transducer (20).

* * * * *